(12) United States Patent
Gregg et al.

(10) Patent No.: US 11,377,965 B2
(45) Date of Patent: *Jul. 5, 2022

(54) GAS TURBINE ENGINE AIRFOIL COOLING CIRCUIT ARRANGEMENT

(71) Applicant: UNITED TECHNOLOGIES CORPORATION, Farmington, CT (US)

(72) Inventors: Shawn J. Gregg, Wethersfield, CT (US); Dominic J. Mongillo, West Hartford, CT (US); Michael Leslie Clyde Papple, Longueuil (CA); Russell J. Bergman, Windsor, CT (US); Mohammed Ennacer, St. Hubert (CA)

(73) Assignee: Raytheon Technologies Corporation, Farmington, CT (US)

( * ) Notice: Subject to any disclaimer, the term of this patent is extended or adjusted under 35 U.S.C. 154(b) by 1253 days.

This patent is subject to a terminal disclaimer.

(21) Appl. No.: 15/450,087

(22) Filed: Mar. 6, 2017

(65) Prior Publication Data

US 2017/0175631 A1 Jun. 22, 2017

Related U.S. Application Data

(63) Continuation of application No. 13/599,226, filed on Aug. 30, 2012, now Pat. No. 9,759,072.

(51) Int. Cl.
*F01D 5/18* (2006.01)
*F01D 9/04* (2006.01)
(Continued)

(52) U.S. Cl.
CPC ............. *F01D 5/188* (2013.01); *F01D 5/187* (2013.01); *F01D 5/189* (2013.01); *F01D 9/041* (2013.01);
(Continued)

(58) Field of Classification Search
CPC ...................................................... F01D 5/188
See application file for complete search history.

(56) References Cited

U.S. PATENT DOCUMENTS 3,628,880 A * 12/1971 Smuland ................. F01D 5/189
415/175
3,846,041 A 11/1974 Albani
(Continued)

FOREIGN PATENT DOCUMENTS

| EP | 1136651 A1 | 9/2001 |
| EP | 1221538 A1 | 7/2002 |
| GB | 1322801 | 7/1973 |

OTHER PUBLICATIONS

International Search Report and Written Opinion for PCT Application No. PCT/US2013/056550 dated Nov. 6, 2013.
(Continued)

*Primary Examiner* — Christopher Verdier
*Assistant Examiner* — Cameron A Corday
(74) *Attorney, Agent, or Firm* — Carlson, Gaskey & Olds, P.C.

(57) ABSTRACT

A component for a gas turbine engine includes, among other things, an airfoil that extends between a leading edge and a trailing edge and a cooling circuit disposed inside of the airfoil. The cooling circuit includes at least one core cavity that extends inside of the airfoil, a baffle received within the at least one core cavity, a plurality of pedestals positioned adjacent to the at least one core cavity and a first plurality of axial ribs positioned between the plurality of pedestals and the trailing edge of the airfoil.

10 Claims, 3 Drawing Sheets

(51) Int. Cl.
*F01D 25/12* (2006.01)
*F02C 7/12* (2006.01)
*F04D 29/32* (2006.01)
*F04D 29/54* (2006.01)
*F04D 29/58* (2006.01)

(52) U.S. Cl.
CPC ............... *F01D 25/12* (2013.01); *F02C 7/12* (2013.01); *F04D 29/324* (2013.01); *F04D 29/542* (2013.01); *F04D 29/582* (2013.01); F05D 2220/32 (2013.01); F05D 2240/126 (2013.01); F05D 2240/30 (2013.01); F05D 2260/201 (2013.01); F05D 2260/2212 (2013.01); F05D 2260/22141 (2013.01); Y02T 50/60 (2013.01)

(56) References Cited

U.S. PATENT DOCUMENTS

| | | | |
|---|---|---|---|
| 4,403,917 A | | 9/1983 | Laffitte et al. |
| 5,246,341 A | | 9/1993 | Hall et al. |
| 5,288,207 A | | 2/1994 | Linask |
| 5,533,864 A | | 7/1996 | Nomoto et al. |
| 5,688,104 A | * | 11/1997 | Beabout ............... F01D 5/187 |
| | | | 415/115 |
| 5,772,397 A | | 6/1998 | Morris et al. |
| 6,193,465 B1 | | 2/2001 | Liotta et al. |
| 6,234,754 B1 | | 5/2001 | Zelesky et al. |
| 6,257,831 B1 | * | 7/2001 | Papple ................. B22C 9/10 |
| | | | 416/97 R |
| 6,602,047 B1 | | 8/2003 | Barreto et al. |
| 6,974,308 B2 | | 12/2005 | Halfmann et al. |
| 7,150,601 B2 | * | 12/2006 | Pietraszkiewicz ........ F01D 5/18 |
| | | | 416/97 R |
| 7,258,528 B2 | | 8/2007 | Trindade et al. |
| 7,478,994 B2 | * | 1/2009 | Cunha ................. F01D 5/18 |
| | | | 416/97 R |
| 7,600,966 B2 | | 10/2009 | Devore et al. |
| 7,607,891 B2 | | 10/2009 | Cherolis et al. |
| 7,762,784 B2 | | 7/2010 | Propheter-Hinckley |
| 2002/0021966 A1 | | 2/2002 | Kvasnak et al. |
| 2005/0265839 A1 | | 12/2005 | Mongillo, Jr. et al. |
| 2006/0107668 A1 | | 5/2006 | Cunha et al. |
| 2007/0041835 A1 | | 2/2007 | Charbonneau et al. |
| 2007/0243065 A1 | | 10/2007 | Devore et al. |
| 2008/0050244 A1 | | 2/2008 | Cherolis et al. |
| 2008/0286115 A1 | * | 11/2008 | Liang ................. F01D 5/186 |
| | | | 416/97 R |
| 2012/0076660 A1 | | 3/2012 | Spangler et al. |

OTHER PUBLICATIONS

Extended European Search Report for Application No. EP 13 83 2115 dated Nov. 3, 2015.
International Preliminary Report on Patentability for PCT Application No. PCT/US2013/056550, dated Mar. 12, 2015.

* cited by examiner

GAS TURBINE ENGINE AIRFOIL COOLING CIRCUIT ARRANGEMENT

CROSS REFERENCE TO RELATED APPLICATIONS

This is a continuation of U.S. patent application Ser. No. 13/599,226, which was filed on Aug. 30, 2012.

BACKGROUND

This disclosure relates to a gas turbine engine, and more particularly to an airfoil cooling circuit for cooling the airfoil.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of the gas turbine engine typically include alternating rows of rotating blades and stationary vanes. The rotating blades either create or extract energy from the hot combustion gases that are communicated through the gas turbine engine, and the vanes convert the velocity of the airflow into pressure and prepare the airflow for the next set of blades. The hot combustion gases are communicated over airfoils of the blades and the vanes. The airfoils may include internal cooling circuits that receive a cooling airflow to cool the various internal and external surfaces of the airfoils.

SUMMARY

A component for a gas turbine engine according to an exemplary aspect of the present disclosure including, among other things, an airfoil that extends between a leading edge and a trailing edge and a cooling circuit disposed inside of the airfoil. The cooling circuit includes at least one core cavity that extends inside of the airfoil, a baffle received within the at least one core cavity, a plurality of pedestals positioned adjacent to the at least one core cavity and a first plurality of axial ribs positioned between the plurality of pedestals and the trailing edge of the airfoil.

In a further non-limiting embodiment of the foregoing component, the component is a turbine vane.

In a further non-limiting embodiment of either of the foregoing components, each of the baffle, the plurality of pedestals and the first plurality of axial ribs are radially disposed within the airfoil.

In a further non-limiting embodiment of any of the foregoing components, the at least one core cavity includes a second plurality of axial ribs that are radially spaced along at least one inner wall of the at least one core cavity.

In a further non-limiting embodiment of any of the foregoing components, a plurality of augmentation features are between each rib of the second plurality of axial ribs.

In a further non-limiting embodiment of any of the foregoing components, at least one feed hole extends through the baffle.

In a further non-limiting embodiment of any of the foregoing components, the plurality of pedestals includes at least a first row of pedestals and a second row of pedestals. The second row of pedestals is staggered relative to the first row of pedestals.

In a further non-limiting embodiment of any of the foregoing components, the airfoil includes an inner diameter portion, an outer diameter portion and a mid-portion between the inner diameter portion and the outer diameter portion. A portion of the first plurality of axial ribs nearest to each of the inner diameter portion and the outer diameter portion are spaced a larger distance relative to one another than another portion of the first plurality of axial ribs nearest the mid-portion.

In a further non-limiting embodiment of any of the foregoing components, at least one of the first plurality of axial ribs includes a break that divides at least one of the first plurality of axial ribs into a first rib section and a second rib section.

In a further non-limiting embodiment of any of the foregoing components, at least one discharge opening is at the trailing edge of the airfoil.

In a further non-limiting embodiment of any of the foregoing components, the at least one discharge opening extends through a pressure side of the airfoil.

In a further non-limiting embodiment of any of the foregoing components, a leading edge core cavity is fluidly isolated from the at least one core cavity.

A gas turbine engine according to an exemplary aspect of the present disclosure includes, among other things, a compressor section, a combustor section in fluid communication with the compressor section and a turbine section in fluid communication with the combustor section. At least one of the compressor section and the turbine section includes at least one component having an airfoil that extends between a leading edge and a trailing edge and a cooling circuit disposed inside of the airfoil. The cooling circuit includes at least one core cavity that radially extends through the airfoil and includes a first plurality of axial ribs. A baffle is received within the at least one core cavity. A plurality of pedestals are positioned adjacent to the at least one core cavity and a second plurality of axial ribs are positioned between the plurality of pedestals and the trailing edge of the airfoil.

In a further non-limiting embodiment of the foregoing gas turbine engine, the at least one component is a vane.

In a further non-limiting embodiment of either of the foregoing gas turbine engines, a plurality of augmentation features are positioned between each rib of each of the first plurality of axial ribs and the second plurality of axial ribs.

In a further non-limiting embodiment of any of the foregoing gas turbine engines, each of the plurality of pedestals are oblong shaped.

In a further non-limiting embodiment of any of the foregoing gas turbine engines, the baffle extends between opposing open ends and includes at least one feed hole.

A method of cooling a component of a gas turbine engine according to another exemplary aspect of the present disclosure includes, among other things, feeding a cooling airflow through a baffle that is disposed within a core cavity of an airfoil of the component, communicating the cooling airflow across a first plurality of axial ribs, communicating the cooling airflow across a plurality of pedestals, and communicating the cooling airflow across a second plurality of axial ribs.

In a further non-limiting embodiment of the foregoing method of cooling a component of a gas turbine engine, the method includes the step of expelling the cooling airflow from the component to a core flow path of the gas turbine engine.

In a further non-limiting embodiment of either of the foregoing methods of cooling a component of a gas turbine engine, the step of expelling includes communicating the cooling airflow through a discharge opening near a trailing edge of the airfoil.

The various features and advantages of this disclosure will become apparent to those skilled in the art from the following detailed description. The drawings that accompany the detailed description can be briefly described as follows.

DETAILED DESCRIPTION

Figure 1:
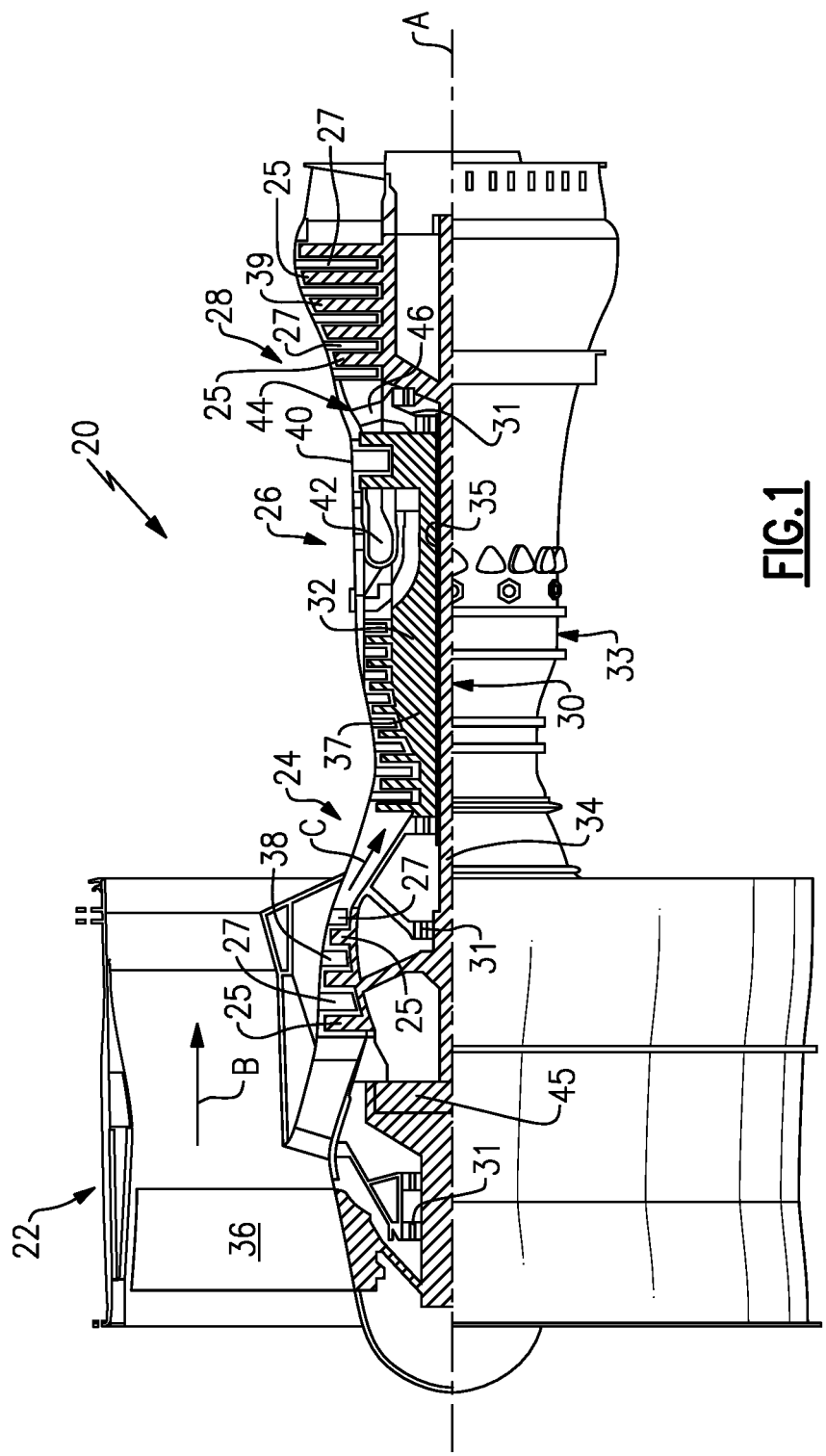
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds, which can increase the operational efficiency of the low pressure compressor 38 and low pressure turbine 39 and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core air flow to the blades 25 to either add or extract energy.

Various components of a gas turbine engine 20, such as the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits for cooling an airfoil of a component are discussed below.

Figure 2:
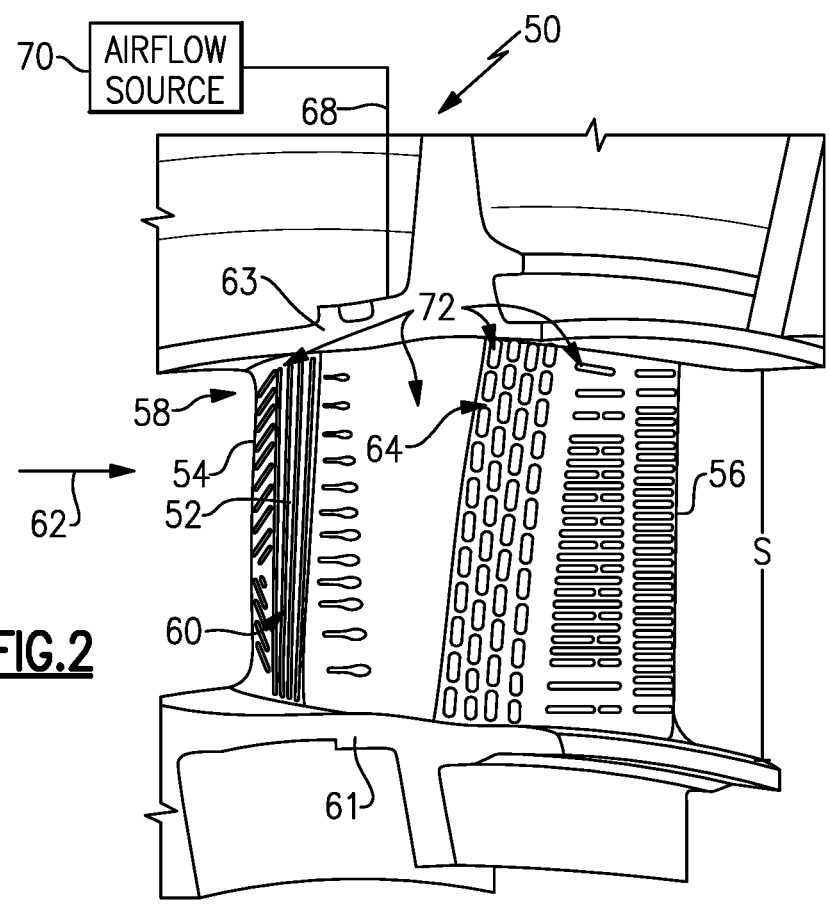
FIG. 2 illustrates a component that can be incorporated into a gas turbine engine.

FIG. 2 illustrates a component 50 that can be incorporated into a gas turbine engine, such as the gas turbine engine 20 of FIG. 1. The component 50 includes an airfoil 52 that axially extends between a leading edge 54 and a trailing edge 56 and circumferentially extends between a pressure side 58 and a suction side 60. In this embodiment, the airfoil 52 extends across a span S between an inner platform 61 and an outer platform 63. In other words, the component 50 is illustrated as a vane. However, the airfoil 52 could also extend from a platform and a root portion connected to the platform where the component is a blade.

A gas path 62 is communicated axially downstream through the gas turbine engine 20 along the core flow path C (FIG. 1) in a direction that extends from the leading edge 54 toward the trailing edge 56 of the airfoil 52. The gas path 62 is schematically represented by an arrow and represents the communication of core airflow across the airfoil 52.

The component 50 may include a cooling circuit 64 for cooling the internal and/or external surfaces of the airfoil 52. In this embodiment, the airfoil 52 is shown in phantom to better illustrate some of the features of the cooling circuit 64. The cooling circuit 64 can include one or more core cavities 72 (that can be formed by using ceramic cores) that are radially, axially and/or circumferentially disposed inside of the airfoil 52 to establish cooling passages for receiving a cooling airflow 68 to cool the airfoil 52. For example, the cooling circuit 64 can receive the cooling airflow 68 from an airflow source 70 that is external to the airfoil 52. The cooling airflow 68 is generally a lower temperature than the airflow of the gas path 62 that is communicated across the airfoil 52. In one embodiment, the cooling airflow 68 is a bleed airflow that can be sourced from the compressor section 24 or any other portion of the gas turbine engine 20 that is upstream from the component 50. The cooling airflow 68 can be circulated through the cooling circuit 64, including through one or more of the core cavities 72, to transfer thermal energy from the component 50 to the cooling airflow 68 thereby cooling the airfoil 52.

The cooling circuit 64 illustrated in this embodiment could be incorporated into any component that requires dedicated cooling, including but not limited to any component that extends into the core flow path C of the gas turbine engine 20 (see FIG. 1). In the illustrated embodiments, and only for the purpose of providing detailed examples herein, the exemplary cooling circuits 64 of this disclosure are illustrated with respect to vanes of the compressor section 24 and/or the turbine section 28. It should be understood, however, that the teachings of this disclosure are not limited to vanes.

Figure 3:
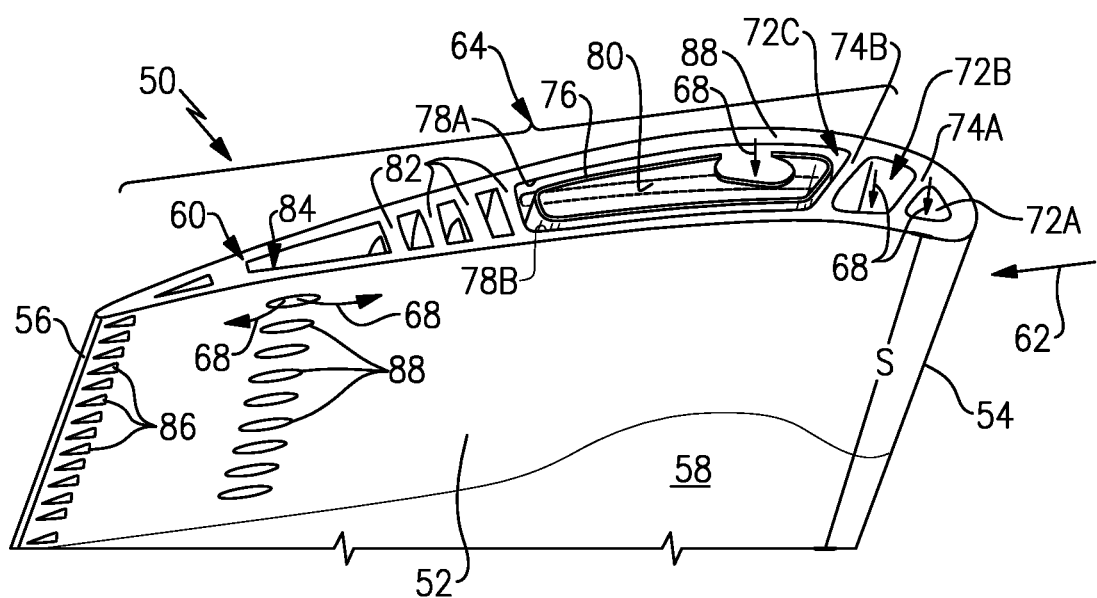
FIG. 3 illustrates a cross-sectional view of a component.

FIG. 3 (with continued reference to FIG. 2) illustrates one exemplary cooling circuit 64 that can be incorporated into the component 50. The cooling circuit 64 is generally defined inside of the airfoil 52 and extends axially between the leading edge 54 and the trailing edge 56 and circumferentially between the pressure side 58 and the suction side 60.

In this exemplary embodiment, the cooling circuit 64 includes multiple core cavities 72A, 72B and 72C. It should be understood that any number of core cavities could be arranged to extend inside of the airfoil 52. The core cavities 72A, 72B and 72C may or may not be in fluid communication with one another.

In this embodiment, a first core cavity 72A represents a leading edge core impingement cavity, a second core cavity 72B represents a leading edge core down-pass cavity, and a third core cavity 72C represents an intermediate cavity of the cooling circuit 64. The cooling airflow 68 (see FIG. 2) can be communicated through the core cavities 72A, 72B and 72C to cool the internal surfaces of the airfoil 52. A first rib 74A may separate the first core cavity 72A from the second core cavity 72B, and a second rib 74B may be positioned between the second core cavity 72B and the third core cavity 72C. The radially extending first and second ribs 74A and 74B may establish airfoil walls that divide the core cavities 72A, 72B and 72C from one another. In one embodiment, the core cavities 72A, 72B and 72C are fluidly isolated from one another. In another embodiment, the core cavities 72B and 72C receive cooling airflows 68 that are from separate sources.

A baffle 76 can be received in at least one of the core cavities 72A, 72B and 72C. In this embodiment, the baffle 76 is received within the third core cavity 72C. The baffle 76 extends radially within the core cavity 72C across the span S of the airfoil 52. The baffle 76 is supported within the core cavity 72C by a first plurality of axial ribs 80 (best seen in FIG. 5) that extend from the core cavity 72C. For example, each of the first plurality of axial ribs 80 can be radially spaced along both a suction sidewall 78A and a pressure sidewall 78B of the core cavity 72C to maintain a spaced relationship between the baffle 76 and the core cavity 72C. The first plurality of axial ribs 80 compartmentalize the flow of the cooling airflow 68 within the core cavity 72C (i.e. the cooling airflow 68 is directed between adjacent ribs along the suction sidewall 78A and the pressure sidewall 78B).

The cooling circuit 64 can further include a plurality of pedestals 82 that are positioned downstream from the baffle 76 (i.e., between the core cavity 72C and the trailing edge 56). The plurality of pedestals 82 extend between opposite inner surfaces of the pressure side 58 and the suction side 60 of the airfoil 52. The plurality of pedestals 82 improve the rigidity of the airfoil 52 and may temporarily restrict the flow of the cooling airflow 68 through the cooling circuit 64 to impinge subsequent pedestals of the plurality of pedestals 82. The plurality of pedestals 82 also increase the surface area of the cooling circuit 64, which may result in an increased amount of heat transfer between the cooling airflow 68 and the airfoil 52.

A second plurality of axial ribs 84 of the cooling circuit 64 may be positioned between the plurality of pedestals 82 and the trailing edge 56 of the airfoil 52. Like the first plurality of axial ribs 80, the second plurality of axial ribs 84 compartmentalize the flow of the cooling airflow 68 to accelerate the flow and increase the surface area heat transfer effect of the cooling circuit 64.

One or more discharge openings 86 may be positioned near the trailing edge 56 of the airfoil 52. The discharge openings 86 expel the cooling airflow 68 from the cooling circuit 64 into the gas path 62. In this embodiment, the discharge openings 86 extend through the pressure side 58 of the airfoil 52. However, other configurations are also contemplated, including but not limited to, a center discharge in which the discharge openings 86 extend through the trailing edge 56 between the pressure side 58 and the suction side 60.

Additionally, both the pressure side 58 and the suction side 60 can include one or more cooling holes 88 for discharging cooling airflow 68 from the cooling circuit 64. For example, portions of the cooling airflow 68 may be expelled from the airfoil 52 through the cooling holes 88 to provide a layer of film cooling air on the outer surface of the airfoil 52.

Together, the core cavities 72A, 72B and 72C, the baffle 76, the first plurality of axial ribs 80, the plurality of pedestals 82, the second plurality of axial ribs 84, the discharge openings 86 and the cooling holes 88 establish the cooling circuit 64. These features cooperate to cool the airfoil 52 with a cooling airflow that requires only a minimal supply pressure. In particular, the combination of the features of the exemplary cooling circuit 64 optimize pressure loss, cooling air heat pick up, and convective heat transfer to provide the necessary convective and conductive heat transfer in order to manage external heat load and meet local cooling effectiveness requirements. The exemplary cooling circuit 64 couples multiple heat transfer cooling features in series such that the flow field generated by upstream augmentation features will directly influence the thermal cooling performance of subsequent downstream features of the cooling circuit 64. The interrelationship of how each of the internal convective cooling features influences local and overall cooling performance will be uniquely different than if each of the features of the cooling circuit 64 were utilized independently.

Figure 4:
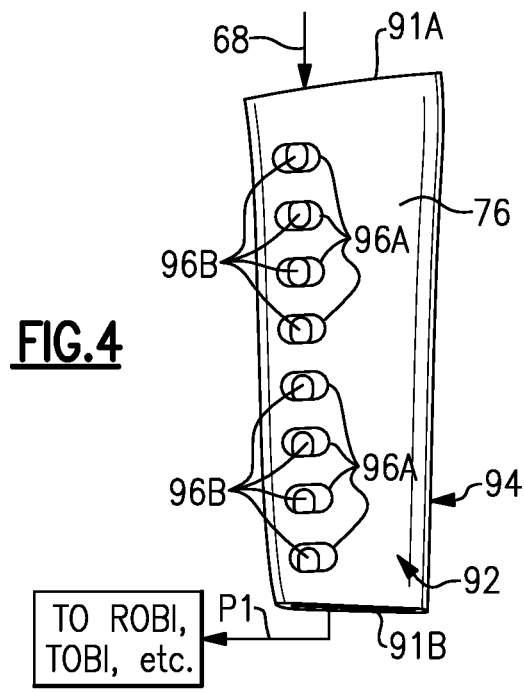
FIG. 4 illustrates a baffle of a cooling circuit.

FIG. 4 illustrates an exemplary baffle 76 that can be incorporated into the cooling circuit 64. The baffle 76 extends radially in span between opposing open ends 91A, 91B. The baffle 76 includes a convex side 92 and a concave side 94. Each of the convex side 92 and the concave side 94 include a plurality of feed holes 96A, 96B, respectively. In this embodiment, the feed holes 96A on the convex side 92 are larger than the feed holes 96B of the concave side 94. Accordingly, a greater amount of cooling airflow 68 can be communicated through the baffle 76 and onto the suction side 60 of the airfoil 52 as compared to the amount of cooling airflow 68 that is communicated onto the pressure side 58.

In addition to diverting flow of the cooling airflow 68 through the cooling circuit 64, the baffle 76 can also divert a portion P1 of the cooling airflow 68 to hardware that is separate from the airfoil 52. In one embodiment, the portion P1 of the cooling airflow 68 is communicated through one of the open ends 91A, 91B and is diverted through a radial on-board injection (ROBI) unit, a tangential on-board injection (TOBI) unit, or some other hardware of the gas turbine engine 20.

Figure 5:
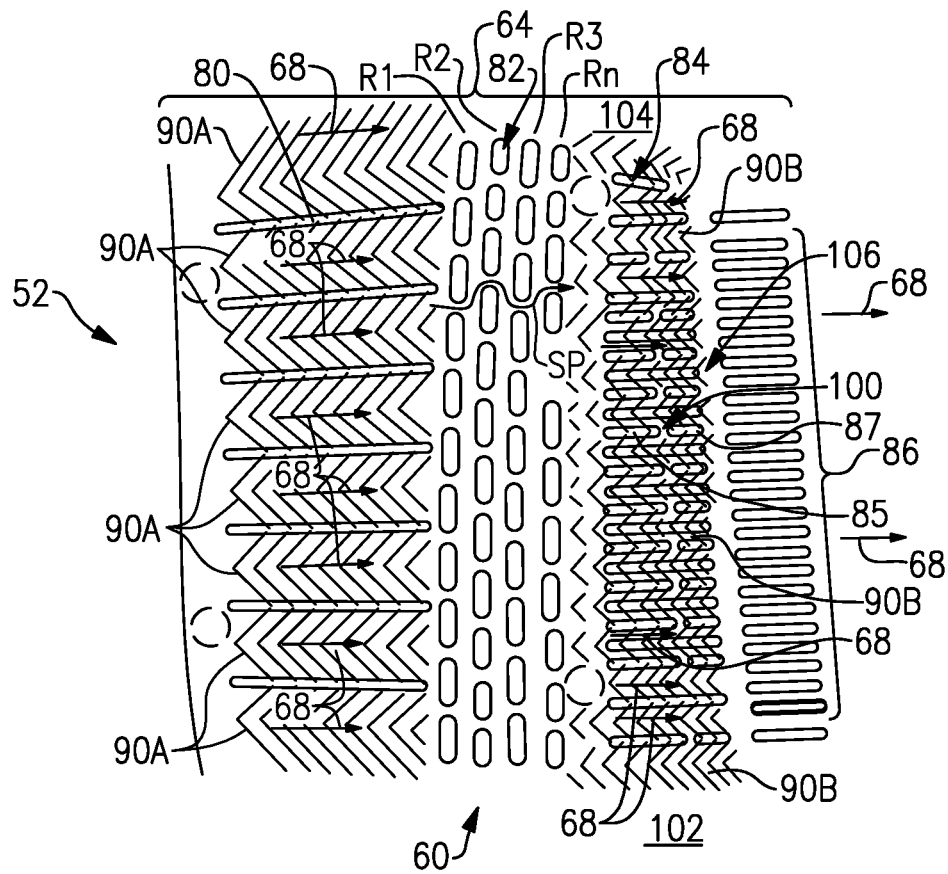
FIG. 5 illustrates an exemplary cooling circuit that can be incorporated into a component of a gas turbine engine.

Additional features of the exemplary cooling circuit 64 are illustrated in FIG. 5. This embodiment of the cooling circuit 64 is viewed from the suction side 60 of the airfoil 52. A plurality of augmentation features 90A can be incorporated into the cooling circuit 64. In one embodiment, the plurality of augmentation features 90A extend between each of the first plurality of axial ribs 80. The plurality of augmentation features 90A can include chevron trip strips, linear trip strips, skewed trip strips or any other augmentation feature. The first plurality of axial ribs 80 can direct the cooling airflow 68 over the plurality of augmentation features 90A to increase the heat transfer coefficients of the cooling circuit 64.

The plurality of pedestals 82 are positioned immediately downstream from the first plurality of axial ribs 80 of the core cavity 72C. In this embodiment, the plurality of pedestals 82 are each oblong shaped and are arranged in multiple rows R1 through Rn, with each row including one or more pedestals 82. Any number of rows of the plurality of pedestals 82 can be disposed within the airfoil 52. The plurality of pedestals 82 are radially spaced in each row $R1$-$R_N$. In this embodiment, the plurality of pedestals 82 of the second row R2 are staggered, or offset, relative to the pedestals 82 of the first row R1 such that the cooling airflow 68 is forced to flow in a serpentine path SP through the plurality of pedestals 82. The subsequent rows R3 through Rn can also include a similar staggered relationship.

The second plurality of axial ribs 84 are radially spaced along a span of the airfoil 52 and axially extend between the plurality of pedestals 82 and the discharge openings 86. One or more of the second plurality of axial ribs 84 can include a break 100 along an axial length of the axial rib 84 such that the axial rib 84 is divided into a first rib section 85 and a second rib section 87. The breaks 100 allow for radial pressure equalization and, in the event of a plugged passage, an alternate path for cooling airflow 68 to exit (i.e., cooling flow redistribution). A plurality of augmentation features 90B can also be disposed relative to the second plurality of axial ribs 84. The plurality of augmentation features 90B can include chevron trip strips, linear trip strips, skewed trip strips or any other augmentation feature. In this embodiment, the plurality of augmentation features 90B are different from the plurality of augmentation features 90A. The axial ribs 84 positioned nearest to the inner diameter 102 and the outer diameter 104 portions of the airfoil 52 can be spaced a larger distance relative to one another as compared to the axial ribs 84 positioned nearest to a mid-portion 106 of the airfoil 52.

With reference to FIGS. 3-5, the cooling circuit 64 can be utilized to cool the airfoil 52 of the component 50. The cooling airflow 68 may be communicated into one or more of the core cavities 72A, 72B and 72C. For example, the cooling airflow 68 can be communicated into the core cavity 72A to impingement cool the leading edge 54 of the airfoil and can be communicated into the core cavity 72B to convectively cool the leading edge 54 (see FIG. 3).

Cooling airflow 68 can also be communicated into the baffle 76 to cool other portions of the airfoil 52 (see FIGS. 3 and 4). For example, the cooling airflow 68 can be communicated into the baffle 76 and then through the feed holes 96A, 96B such that the cooling airflow 68 is compartmentalized between each of the first plurality of axial ribs 80 (see FIG. 5). The cooling airflow 68 can then be communicated axially between the first plurality of axial ribs 80 and over the plurality of augmentation features 90A (see FIG. 5). The cooling airflow 68 next passes through the plurality of pedestals 82 (along the serpentine path SP) and is then compartmentalized by the second plurality of axial ribs 84 (see FIG. 5). The cooling airflow 68 may pass over portions of the plurality of augmentation features 90B while it is axially communicated along the second plurality of axial ribs 84. Finally, the cooling airflow 68 is expelled from the airfoil 52 into the core flow path C via the discharge openings 86. Prior to being expelled through the discharge openings 86, portions of the cooling airflow 68 can be expelled from the airfoil 52 through the cooling holes 88 to provide a layer of film cooling air onto the outer surface of the airfoil 52 (see FIG. 3).

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
    a compressor section;
    a combustor section in fluid communication with said compressor section;
    a turbine section in fluid communication with said combustor section; and
    at least one of said compressor section and said turbine section including a component having an airfoil that extends between a leading edge and a trailing edge and a cooling circuit disposed inside of said airfoil, wherein said cooling circuit includes:
        at least one core cavity that radially extends inside said airfoil and includes a first plurality of axial ribs;
        a baffle received within said at least one core cavity, wherein said baffle includes a convex side and a concave side, and each of said convex side and said concave side include a plurality of feed holes, and said plurality of feed holes of said convex side are larger than said plurality of feed holes of said concave side;
        a plurality of pedestals positioned adjacent to said at least one core cavity; and
        a second plurality of axial ribs positioned between said plurality of pedestals and said trailing edge of said airfoil.

2. The gas turbine engine as recited in claim 1, wherein said component is a vane.

3. The gas turbine engine as recited in claim 1, comprising a plurality of augmentation features between each rib of each of said first plurality of axial ribs and said second plurality of axial ribs.

4. The gas turbine engine as recited in claim 1, wherein each of said plurality of pedestals are oblong shaped.

5. The gas turbine engine as recited in claim 1, wherein said baffle extends between opposing open ends and includes at least one feed hole.

6. The gas turbine engine as recited in claim 1, wherein said first plurality of axial ribs are radially disposed along an inner wall of said at least one core cavity.

7. The gas turbine engine as recited in claim 1, wherein said airfoil includes an inner diameter portion, an outer diameter portion, and a mid-portion between said inner diameter portion and said outer diameter portion, and a portion of said first plurality of axial ribs nearest to each of said inner diameter portion and said outer diameter portion are spaced a larger distance relative to one another than another portion of said first plurality of axial ribs nearest said mid-portion.

8. The gas turbine engine as recited in claim 1, wherein at least one of said second plurality of axial ribs includes a break that divides said at least one of said second plurality of axial ribs into a first rib section and a second rib section.

9. The gas turbine engine as recited in claim 1, wherein said plurality of pedestals includes at least a first row of pedestals and a second row of pedestals, wherein said second row of pedestals is radially staggered relative to said first row of pedestals.

10. The gas turbine engine as recited in claim 1, comprising a leading edge core cavity that is fluidly isolated from said at least one core cavity.

* * * * *